United States Patent [19]
Levine et al.

[11] 4,179,695
[45] Dec. 18, 1979

[54] SYSTEM FOR IDENTIFICATION OF AIRCRAFT ON AIRPORT SURFACE PATHWAYS

[75] Inventors: Arnold M. Levine, Chatsworth, Calif.; Ray O. Waddoups, Mesa, Ariz.

[73] Assignee: International Telephone and Telegraph Corporation, New York, N.Y.

[21] Appl. No.: 947,729

[22] Filed: Oct. 2, 1978

[51] Int. Cl.$^2$ .............................................. G01S 9/56
[52] U.S. Cl. .............................. 343/6.5 R; 343/5 LS
[58] Field of Search ............ 343/5 LS, 6.5 R, 6.5 LC

[56] References Cited

U.S. PATENT DOCUMENTS

| | | | |
|---|---|---|---|
| 2,920,320 | 1/1960 | Ross | 343/5 LS X |
| 3,101,471 | 8/1963 | Stavis | 343/5 LS X |
| 3,564,543 | 2/1971 | Nehama et al. | 343/6.5 R |
| 3,872,474 | 3/1975 | Levine | 343/5 LS |
| 4,126,859 | 11/1978 | Bohm | 343/5 LS |

*Primary Examiner*—Malcolm F. Hubler
*Attorney, Agent, or Firm*—William J. O'Neil

[57] ABSTRACT

For aircraft equipped with ATCRBS, an interrogation system including an interrogator and an auxiliary transponder located adjacent the runway and on opposite sides thereof, respectively. The interrogator is enabled through a signal cable from a remote location, such as a control tower, to produce the first of the discretely spaced pulse pair required to interrogate the ATCRBS equipment. The second interrogation pulse of the pair is generated by the transponder, which is activated by the radiated first pulse from the interrogator and includes an internal delay, such that this delay plus the transit time from the transponder serves to generate the second pulse of the pair if the aircraft to be interrogated is in the vicinity and on the pathway centerline or within a specified lateral tolerance therefrom. The ATCRBS reply may be received directly at the control tower or may be transmitted by cable from receiving equipment within the interrogator. ATCRBS decoding and display equipment may be employed at the control tower for discrete identification of a given aircraft. The identification points may be distributed along a runway, taxiway or other surface area of an airport for continuing identification.

10 Claims, 3 Drawing Figures

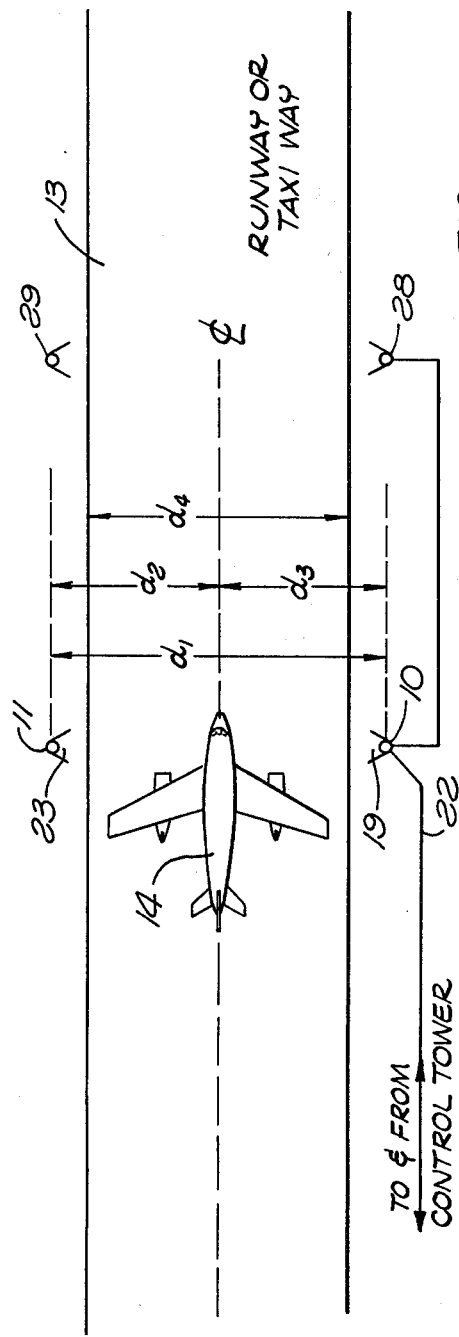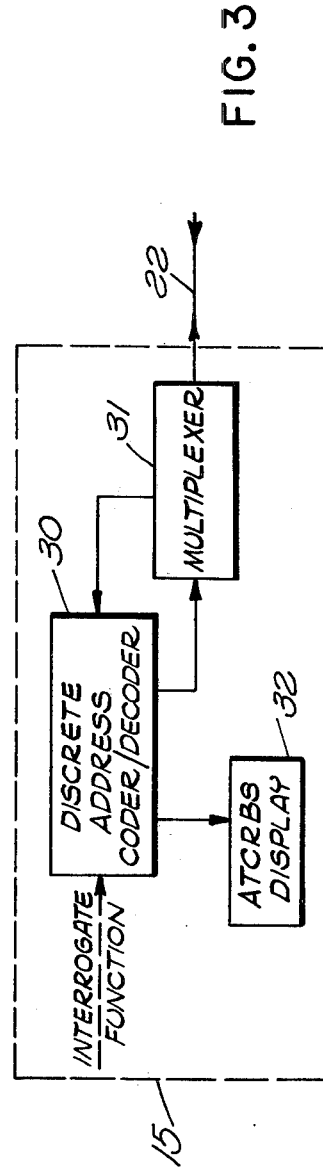

SYSTEM FOR IDENTIFICATION OF AIRCRAFT ON AIRPORT SURFACE PATHWAYS

BACKGROUND OF THE INVENTION

1. Field of the Invention

The invention relates to apparatus for surveillance and identification of aircraft along runways, taxiways and other prescribed pathways on the surface of an airport.

2. Description of the Prior Art

In the prior art much attention has been devoted to enroute navigation by electronic means, for commercial aircraft especially. Approach and landing aids have also received much attention, the best known of these being of the ILS (Instrument Landing System) type providing cross-pointer indication in the cockpit of an aircraft in both the localizer (azimuth), and glideslope (elevation) coordinates. Various radar systems, including the well-known GCA (Ground Controlled Approach) system have also been effectively used to track aircraft approaching for landing so that verbal instructions can be given, by radio, permitting a pilot to correct his landing approach in both azimuth and elevation in essentially zero visibility conditions.

It has been more recently recognized that an additional problem exists once the aircraft has landed, namely, the problem of ground or airport surface surveillance and identification. Especially in large metropolitan airports, weather conditions as benign as atmospheric haze may restrict visibility to the end of a relatively long runway and the related taxiways and approach ramps, even for an optimally located control tower. Still further, the presence of buildings and other structures about the perimeter of such metropolitan airports produces further difficulty in obtaining clear visual surveillance of the entire surface of an airport from the control tower.

One of the well-known approaches to airport surface traffic control has been the use of scanning radars operating at very high frequencies, such as the so-called "K" radar band. This is considered necessary in order to obtain adequate definition and resolution. An existing airport, ground, traffic control equipment of that type is known in the art as ASDE (Airport Surface Detection Equipment). As generally conceived such equipment provides surveillance only, no discrete identification of aircraft on the surface being available.

Among the other proposed systems for the purpose is a socalled Tower-Automated, Ground Surveillance (TAGS) which uses multilateration to interrogate aircraft transponders.

Still further, the so-called LOCAR (Localized Cable Radar) has been proposed, this system being described in U.S. Pat. No. 3,872,474.

High definition surface surveillance equipment, such as the so-called ASDE has other significant disadvantages. Among these is the need for a relatively high antenna tower and a relatively large rotating antenna system thereon. Large reflectors or other expedients are employed to obtain sufficiently narrow beams for the purpose. Shadowing due to structures, undesired reflections and unacceptably high absorption of the transmitted radar energy in the presence of hydrometeoric phenomena occurs due to the extremely high radar frequencies employed.

The so-called TAGS system, while it does provide identification, depends on a complex, centralized, multilateration technique requiring expensive and complicated timing, blanking and processing equipment. Additionally, surveillance is usually not provided over the entire airport surface because central locations providing unshadowed line-of-sight over the entire airport surface of interest are not generally available.

The LOCAR system described in the aforementioned U.S. Pat. No. 3,872,474, is a system with which the present invention is compatible structurally and functionally. The LOCAR as described in U.S. Pat. No. 3,872,474 provides no discrete aircraft identification per se but can be augmented to do so by the addition of the apparatus hereinafter described.

The manner in which the invention deals with the disadvantages of the prior art to provide a unique, low-cost, highly effective, airport surface surveillance and identification system will be evident as this description proceeds.

SUMMARY

In consideration of the prior art disadvantages as aforementioned, it may be said to have been the general object of the invention to produce a system for airport surface surveillance and identification which does not require additional "on-board" equipment and which is inexpensive, easy to install and simple to operate.

The combination of the invention involves at least one, but preferably a series of spaced interrogation locations along a runway, taxiway or other portion of an aircraft surface. Each interrogation location involves an interrogator extending minimally above the aircraft surface on one side of the pathway and a similarly low profile transponder on the opposite side. The interrogator itself may include receiving equipment, in one variation, where a signal cable or cables connect the interrogator location (or locations) to a remote location such as a control tower, or in another variation the ATCRBS reply which is solicited by the apparatus of the invention may be received by direct radiation at the remote location.

The on-board ATCRBS equipment is designed to radiate an identifying code, normally when the aircraft is airborne, in response to a pulse pair transmitted to it by a ground station. The invention makes use of this, so-called Mode II operation of the ATCRBS equipment when the pulse pair is spaced 8 microseconds plus or minus a nominal tolerance. This so-called ATCRBS equipment and its operation is described in Chapter 16 of the text "Avionics Navigation System" by Myron Kayton and Walter R. Fried, a John Wiley and Sons publication (1969). The text is further identified as Library of Congress Catalog No. 69-13679. That reference is especially useful to the reader not fully familiar with standard ATCRBS equipment.

According to the invention, the pulse pair required to trigger the ATCRBS is provided discretely at each location by virtue of the fact that it is uniquely generated from two points, one on each side of the runway. Each interrogator location is discretely addressed, preferably digitally, from the remote location to cause it to generate the first of the pulse of the pair. That first pulse not only is "heard" by the ATCRBS on the aircraft to be interrogated, but is also received by the transponder on the opposite side of the runway. An appropriate delay in the transponder together with the delays due to physical spacing insures that the proper interrogation spacing is provided as the second pulse of the interrogation code is generated by the transponder. The basic reason for this arrangement according to the invention is to prevent ATCRBS equipment of other aircraft at other locations on the airport from being interrogated as they would be if both pulses of the pair were initiated from the same point. The signal cable may be a standard electrical coaxial cable, however, fiber optic cables with suitable transducers of known type at both ends could be employed. The discrete addressing of each interrogator on the airport surface is logically accomplished in accordance with a map of the airport surface where the interrogation points are numbered or otherwise identified at the control tower. Whether or not the ATCRBS replies are received directly by radiation or through receiving equipment in the interrogator at a given point along the pathway and then by cable to the control tower, existing ATCRBS decoding and display equipment meant for use in the standard operation of the ATCRBS in connection with aircraft which are enroute or are making landing approaches, can provide the identification of a corresponding aircraft on the ground in a form usable to control tower operating personnel.

The details of a typical embodiment with variations will be understood from the description hereinafter.

BRIEF DESCRIPTION OF THE DRAWINGS

FIG. 1 is a semi-pictorial, plan view illustrating physical relationships among the aircraft, the interrogator and the transponder according to the invention.

FIG. 3 is a schematic block diagram of components within the control tower shown in FIG. 2.

DETAILED DESCRIPTION

Figure 2:
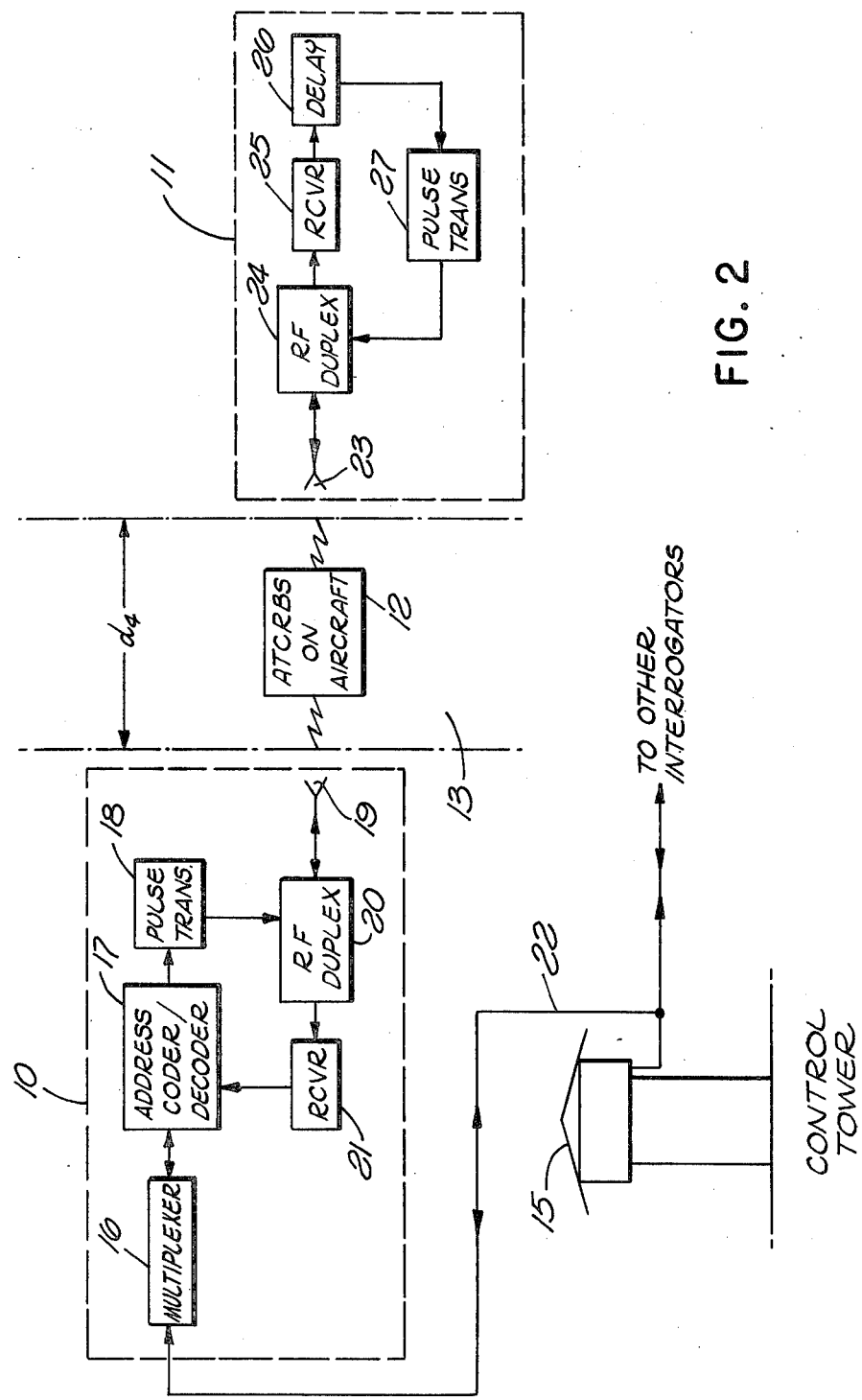
FIG. 2 is a schematic block diagram illustrating the elements of the system according to the invention.

Referring now to FIG. 1, an interrogator 10 with antenna 19 and the corresponding transponder 11 with antenna 23 are illustrated on opposite sides of the runway, taxiway or other pathway 13. Two additional interrogator/transponder combinations comprising 28 and 29 respectively are illustrated, however, it is to be understood that many more such interrogation points would normally be required. A cable 22 from the remote location (control tower normally) communicates with each interrogator in the system, 10 and 28 being two such interrogators. An aircraft 14 proceeding down the pathway 13 passes directly between 10 and 11 and is subject to having its ATCRBS equipment interrogated as will be more fully understood in connection with subsequent description of FIG. 2. The overall lateral spacing between 10 and 11 is depicted as $d_1$, it being understood that this spacing would also apply to 28 and 29 and all other such interrogator/transponder combinations in the system. The distances $d_2$ and $d_3$ would normally each be one-half of $d_1$, although where local conditions might produce some small variation therefrom, it would usually still be possible to have a small difference between $d_2$ and $d_3$ as long as the result is not large enough to cause the spacing between the pulses of the pulse pair for interrogating the ATCRBS on aircraft 14 to thereby be out of tolerance. This will be more fully understood as this description proceeds.

Referring now to FIG. 2, pathway 13, which may be a runway, taxiway or the like is shown having the same width $d_4$ as illustrated on FIG. 1. The ATCRBS equipment 12 is to be understood to be onboard the aircraft 14.

An operator in the control tower 15 initiates an interrogation by sending a discretely coded (discrete address) signal down the cable 22. This description will assume that the interrogator enabling signal thus supplied is an electrical signal is in the video domain. It is highly desirable that this discretely coded interrogation-enabling signal be digital in form, since digital techniques suitable for discretely addressing a desired one out of a plurality of interrogators connected essentially in parallel from cable 22 are well developed and well known in the digital computer art.

If it is assumed that the code supplied from control tower 15 to interrogator 10 via cable 22 at any given time is coded with the the discrete address code for 10, it will pass through multiplexer 16 and into the address coder/decoder 17 for recognition within block 17. This discrete address might also be contained in a simple read-only memory from which a comparison is made to confirm the correctness of the address. Once this has been confirmed, block 17 sends an enabling signal or trigger pulse to pulse transmitter 18 which then transmits the first of the ATCRBS inquiry pulses of the required pulse pair through RF duplexer 20 and toward the aircraft, and the ATCRBS itself identified at 12, via antenna 19. This first pulse also passes on and enters antenna 23 within the transponder 11 where it passes through RF duplexer 24 in this transponder unit 11 and is detected in receiver 25. The delay 26 is adjusted or selected such that the aforementioned pulse pair and transmit it back through RF duplexer 24 and out through antenna 23 to 12 so as to arrive, taking into consideration actual space delays encountered, so that the second pulse arrives at 12 appropriately spaced within the allowable tolerance to activate the on-board ATCRBS unit 12.

The transmitting capability and receiving sensitivity of units 10 and 11 are relatively low in view of their relatively close spacing and their proximity to 12 in operation. The output of ATCRBS unit 12, on the other hand, is much greater in terms of peak pulse power, that unit being designed to cover substantial distances when the aircraft is enroute.

As has been previously indicated, this code might be directly received at control tower 15 by radiation as it would have been in the case of an airborne interrogation situation. In view of the fact that the delay and double point pulse pair generation scheme just described precludes the existence of a pulse pair correctly spaced to cause an activation elsewhere on the airport or on any air-borne ATCRBS nearby, the intended interrogations will therefore be understood to be essentially discrete to the immediate location.

The use of the multiplexer 16 assumes that the arrangement of FIG. 2 contemplates cable transmission of the ACTRBS replay back to the control tower 15. That is, it is received from 12 at antenna 19, passes through the RF duplexer 20 as a received signal and after being detected in receiver 21 is transmitted back on the same cable 22 via multiplexer 16 to the control tower 15.

The multiplexer 16 could be one of several known types, such as a time-sharing multiplexer, a frequency separation device or a polarity separation device. If a fiber optic cable and transmission system as employed, the very great bandwidth thereby available increases the multiplexing options available. Light signal color separation can be used in such systems.

The ATCRBS reply as detected in receiver 21 is again discretely addressed in 17 before it is fed back through cable 22 via multiplexer 16. At this point it is well to realize that certain variations are possible. For example, it may be noted that, since the activation of interrogator 10 results from a discrete enabling code supplied from control tower 15 via cable 22, and since the ATCRBS reply is available for retransmission essentially simultaneously when compared to the speed with which a manually originated inquiry can be repeated in 15, it may be assumed that any reply is from the aircraft just interrogated at the corresponding location on the airport surface. However, where a number of aircraft might be of concern on various areas of the airport at any one time, discrete addressing of the reply, as contemplated in FIG. 2, is obviously desirable. Still further, the skilled practioner in this art will realize that each interrogator such as 10 and 28 might contain a short term memory into which it can record ATCRBS replies continuously. Along with this, the interrogators might be operated in a predetermined sequence at all times to keep these interrogator memories loaded with updated information as a given aircraft passes its location. Discrete addressing from the tower 15 could then obtain this up-to-date information for any selected interrogation location. Referring now to FIG. 3, a schematic block diagram of the components which would be required in the control tower 15 is presented. In response to an interrogation, that is, presumably manual or programmed, a discrete address coder/decoder 30 activates a selected interrogator through multiplexer 31 and cable 22, and into the circuitry of 10 as previously described. The ATCRBS reply returning via cable 22 passes through multiplexer 31 and is directed back into 30 which decodes the discrete address associated therewith as applied in block 17 of any of the various interrogators of the system. From block 30, an existing type ACTRBS display 32 can present the ACTRBS replies obtained in the familiar form. The display 32 may be the same equipment employed in the known ATCRBS systems, the display being operated simultaneously or alternatively for air derived and ground replies as hereinbefore set forth.

To provide some numerical examples of typical airport physical situations, the dimensions indicated on FIG. 1 might be on the order 300 feet for $d_1$, the actual hard surfaced runway or taxiway with $d_4$ being nominally less than 300 feet. In its so-called Mode II operation the ATCRBS equipment responds to a pulse pair spaced 8 microseconds plus or minus 0.2 microseconds. Assuming that the aircraft is precisely on the pathway centerline, $d_2$ and $d_3$ are each 150 feet, that distance corresponding to a radar transit time of 0.150 microseconds. Accordingly, after the first pulse emitted by interrogator 10 reaches the ATCRBS equipment 12 on aircraft 14, an additional 0.150 microseconds will be required for it to traverse the $d_2$ distance to be received at transponder 11. If the delay 26 in transponder 11 is 7.7 microseconds the retransmitted pulse from 11 arrives at the ATCRBS location 12 precisely 8 microseconds after the first pulse. The 0.2 microsecond tolerance in pulse spacing accepted by the ATCRBS equipment will be seen to permit a practical variation in the lateral location of the aircraft with respect to the runway centerline. Although commercial aircraft are not customarily operated much away from the pathway centerline, it is conceivable that at least nominal variations can be expected when weather and visibility are poor. It can readily be shown that response of the transponder at another location on the airport surface even if such were to occur, would not result in the generation of a suitably spaced pulse pair.

In general, it is desirable to supply at least nominal directivity at antennas 19 and 23 associated with 10 and 11 respectively; this in addition to the inherently low powered nature of 10 and 11 forms a combination precluding to a very high degree, the generation of spurious ATCRBS interrogations.

Variations and modifications other than those aforementioned will suggest themselves to those skilled in this art once the unique principals of the present invention are appreciated. Accordingly, it is not intended that the drawings or this description be regarded as limiting the scope of the invention, these being intended to be typical and illustrative only.

What is claimed is:

1. A vehicle identification system particularly for surveillance of aircraft on predetermined surface pathways including runways and other areas of an airport surface, said aircraft having ATCRBS equipment comprising:
    at least one transmitting interrogation located on said airport surface adjacent to a selected one of said surface pathways and spaced laterally by a first distance with respect to the centerline of said pathway;
    first means connected at said remote location and connected to said interrogator for providing activating signals to said interrogator to transmit a first RF pulse;
    second means comprising a transponder responsive to said first RF pulse to produce a second RF pulse, said transponder being located on said surface on the side of said pathway centerline opposite said interrogator to generate a second RF pulse in fixed time relationship after said first RF pulse, said first and second pulse forming a pulse pair for activation of said ATCRBS equipment on a selected aircraft on said pathway in the vicinity of said interrogator and said second means transponder;
    delay means within said second means transponder for delaying the generation of said second RF pulse after reception of said first RF pulse such that said fixed time relationship between said first and second RF pulses forms a properly spaced pulse pair for activation of said ATCRBS equipment, said ATCRBS thereafter broadcasting a predetermined reply code comprising at least an identification code receivable at said remote location.

2. Apparatus according to claim 1 in which said first means includes a first signal conductive cable for conveying a control signal from said remote location.

3. Apparatus according to claim 1 in which said interrogator also includes means for receiving said ATCRBS reply code and a second signal conductive cable responsive to received ATCRBS reply codes for conveying said reply code to said remote location.

4. Apparatus according to claim 2 in which said interrogator includes means for receiving said ATCRBS reply code and multiplexing apparatus to provide for utilization of said first signal conductive cable to convey said ATCRBS reply code to said remote location has traversed said first cable to said interrogator.

5. Apparatus according to claim 1 in which said interrogator and said second means transponder are located on a normal to said pathway centerline and said second means transponder is spaced from said centerline by a second distance therefrom, said interrogator and second means transponder being on opposite sides of said pathway.

6. Apparatus according to claim 5 in which the locations of said interrogator and second means transponder are such that said first and second distances are substantially equal.

7. Apparatus according to claim 4 in which said interrogator and said second means transponder are located on a normal to said pathway centerline and said second means transponder is spaced from said centerline by a second distance therefrom, said interrogator and second means transponder being on opposite sides of said pathway.

8. Apparatus according to claim 7 in which the locations of said interrogator and second means transponder are such that said first and second distances are substantially equal.

9. Apparatus according to claim 4 in which a plurality of said interrogators are provided at spaced locations along said pathway, each with a corresponding second means transponder on the opposite side of said pathway, and in which said first means comprises a signal conducting cable connected to convey said activating signals to all of said interrogators substantially in parallel, in which discrete address means are included at said remote location and in each of said interrogators, whereby a pedetermined one of said interrogators may be activated at any one time.

10. Apparatus according to claim 9 in which said discrete address means are further defined as being responsive to said ATCRBS reply code in said interrogator receiving means to discretely identify said reply code as to location of the interrogator location receiving said reply code at any one time.

* * * * *